United States Patent
Taillade et al.

(10) Patent No.: US 10,871,151 B2
(45) Date of Patent: Dec. 22, 2020

(54) METHOD FOR DETECTING ICING AND DE-ICING

(71) Applicants: Electricite de France, Paris (FR); Centre National de la Recherche Scientifique (CNRS), Paris (FR); Ecole Normale Superieure De Cachan, Cachan (FR)

(72) Inventors: Frédéric Taillade, Clamart (FR); Franck Daout, Puteaux (FR); Francoise Schmitt, Paris (FR)

(73) Assignees: Electricite de France (FR); Centre National de la Recherche Scientifique (CNRS) (FR); Ecole Normale Superieure De Cachan (FR)

( * ) Notice: Subject to any disclaimer, the term of this patent is extended or adjusted under 35 U.S.C. 154(b) by 15 days.

(21) Appl. No.: 16/468,863

(22) PCT Filed: Dec. 13, 2017

(86) PCT No.: PCT/EP2017/082647
§ 371 (c)(1),
(2) Date: Jun. 12, 2019

(87) PCT Pub. No.: WO2018/109016
PCT Pub. Date: Jun. 21, 2018

(65) Prior Publication Data
US 2020/0018293 A1 Jan. 16, 2020

(30) Foreign Application Priority Data
Dec. 13, 2016 (FR) .................................. 16 62353

(51) Int. Cl.
F03D 80/40 (2016.01)

(52) U.S. Cl.
CPC .......... *F03D 80/40* (2016.05); *F05B 2260/80* (2013.01)

(58) Field of Classification Search
None
See application file for complete search history.

(56) References Cited

U.S. PATENT DOCUMENTS 5,005,015 A 4/1991 Dehn et al.
5,474,261 A * 12/1995 Stolarczyk ............. B64D 15/20
244/134 F (Continued)

FOREIGN PATENT DOCUMENTS

| EP | 2635808 A1 | 9/2013 |
| FR | 2650667 A1 | 2/1991 |
| WO | 2013149811 A1 | 10/2013 |

OTHER PUBLICATIONS

Hirsch, et al., "Recent Developments in Miniaturized Planar Harmonic Radar Antennas", InProc. Antennas Meas. Techn. Assoc. Conf., Nov. 2008, pp. 1-6.

(Continued)

*Primary Examiner* — Michael Lebentritt
(74) *Attorney, Agent, or Firm* — Lerner, David, Littenberg, Krumholz & Mentlik, LLP

(57) ABSTRACT

The invention relates to a device for detecting icing and de-icing of a wind turbine blade, characterized in that it comprises: a sensor, placed on the surface of a blade, and comprising a first so-called "receiving" antenna, a second so-called "emitting" antenna, and a frequency divider inserted between said first and second antennas; and an interrogator, configured to emit an electromagnetic wave towards the receiving antenna of said sensor, and to receive an electromagnetic wave from the emitting antenna of said sensor.

14 Claims, 2 Drawing Sheets

(56) References Cited

U.S. PATENT DOCUMENTS

| | | | | |
|---|---|---|---|---|
| 5,686,841 A | * | 11/1997 | Stolarczyk | G01N 22/04 |
| | | | | 324/635 |
| 2009/0188324 A1 | * | 7/2009 | Gregory | G01B 7/16 |
| | | | | 73/773 |
| 2012/0207589 A1 | | 8/2012 | Fridthjof | |
| 2013/0323057 A1 | | 12/2013 | Buchegger et al. | |
| 2018/0287389 A1 | * | 10/2018 | Yu | H02J 3/38 |

OTHER PUBLICATIONS

International Search Report for PCT/EP2017/082647, dated Apr. 11, 2018.

Romeu Gomez, J., "Design of a Chipless Harmonic Radar Temperature Sensor", Thesis of Institute for Microwave Engineering and Photonics, 2013, 57 pages.

* cited by examiner

METHOD FOR DETECTING ICING AND DE-ICING

CROSS-REFERENCE TO RELATED APPLICATIONS

The present application is a national phase entry under 35 U.S.C. § 371 of International Application No. PCT/EP2017/082647, filed Dec. 13, 2017, which claims priority from French Patent Application No. 1662353, filed Dec. 13, 2016, all of which are incorporated herein by reference.

TECHNICAL FIELD

The invention relates to the detection of the icing and de-icing of structures.

The invention aims more specifically at proposing a device for detecting the icing and deicing of a wind turbine blade, and a method for implementing the same.

STATE OF THE ART

The implantation of wind turbines in cold climatic zones generates major constraints, in particular a high frequency of machine icing episodes.

The ice affects a large number of parameters of the machine:
  Blockage of the measuring instruments,
  Modification of the blade profile, implying reduction of the performances and vibrations impacting the structure, and
  Possibility of detachment and projection of ice.

Taking these phenomena into account implies the complete stoppage of the machine during risky periods, which generates losses of production. To limit the periods of stoppage, effective protection means through the removal of accumulated ice, or even through the limitation of the possibilities of ice formation by the use of ad hoc coatings, are implemented. Detection of the appearance and disappearance of ice is also a promising way to protect the machines and limit the stoppages.

Several methods are known to detect ice. They can be classified in two large families depending on whether they detect the formation of ice on the wind turbines (blade or nacelle) in a direct manner (thanks to a dedicated sensor) or in an indirect manner (thanks to the analysis and harmonization of information taken on the operating parameters of the wind turbine such as the produced power, temperature, humidity, wind speed, etc.).

The indirect method requires a fine analysis, often by means of models, which remains difficult to implement by the operators, and unreliable. The direct measurement seems preferable but the sensors do not always perform the measurement directly on the blade; because of their bulk, they are often disposed at a meteorological mast in the vicinity of the wind turbine field or on the nacelle of the wind turbines.

The principle of direct ice detection sensors implements different measurement techniques depending on the nature of the estimated physical quantity: mechanical, electrical/electromagnetic, or optical quantity.

Document FR 2650667 discloses a device for detecting the icing and deicing of aeronautical blades comprising a set of resonant circuits (of the LC type), placed on said blades, and a remote interrogator system. The described circuits are configured to resonate both at a fundamental frequency and at a dual frequency of this fundamental frequency. The interrogator system is equipped with a frequency doubler for emitting at the same time at given frequencies and at dual frequencies thereof. The circuits are thus illuminated by a set of incident frequency pairs (fundamental frequencies and dual frequencies of fundamental frequencies). Frequency and quality factor of the response of the circuits are measured in return, and from this, is deduced the icing or de-icing state of the blade. Equipping the interrogator with a frequency doubler, and configuring the circuits to resonate at their fundamental frequency and at twice of these frequencies, allow distinguishing the responses of the resonant circuits from the signals reflected on the blades.

Besides, document US 2013/0323057 discloses a device for detecting the icing of a wind turbine blade comprising a transponder fixed on the blade and an interrogator unit of said transponder. The interrogator unit remotely illuminates the transponder at increasingly high power levels, until it receives a reliable response therefrom. The device further comprises a comparator that receives the emitted power level for which a reliable response has been received, and compares it with a programmable threshold power value. The result of this comparison indicates whether the blade is iced or not.

The use of an electromagnetic tag (or TAG) of the transponder type, as a sensor is already known from the literature.

Thus, Hirsh [1] describes a corrosion sensor for an industrial storage tank comprising an electromagnetic tag. The tag comprises, in series, a receiving antenna, a corrosion-sensitive chemical element, a non-linear junction, and an emitting antenna. The assembly constitutes an electrical circuit whose impedance is modified by the chemical state of the corrosion-sensitive element. Insofar as, when the tag is illuminated by an incident wave, it re-emits a different signal depending on the impedance state of the circuit, it suffices to analyze the response, at a given illumination, of the tag over time, to know the level of corrosion of the tank.

Similarly, Romeu Gomez [2] teaches the use of an electromagnetic tag as a temperature sensor. The tag comprises, in series, a receiving antenna, a temperature-sensitive frequency filter element, a frequency doubler, and an emitting antenna. For a given illumination of the receiving antenna of the tag, a different response is emitted by the emitting antenna, according to the temperature of the system.

The use of an electromagnetic tag as a sensor is therefore well known, including in the field of wind turbine blade icing. However, all these sensors necessarily comprise the addition of an intermediate element, sensitive to the physical quantity that needs to be measured, which influences the response of the tag.

The need for passive sensors of the electromagnetic tag type therefore appears, which detect both icing and deicing, while being integrated in a device having a simpler structure than that of the prior art. By enabling detection of the de-icing phase, these sensors make it possible to restart the production as soon as possible.

BASIS OF THE INVENTION

The present invention relates to a device for detecting the icing and deicing of a wind turbine blade, characterized in that it comprises:
  on the one hand, a sensor placed on the surface of a blade, and comprising:
    a first antenna, called "receiving antenna",
    a second antenna, called "emitting antenna",
    a frequency doubling device, interposed between said first and second antennas, and on the one hand, an interrogator configured to emit an electromagnetic wave towards the receiving antenna of said sensor, and to receive an electromagnetic wave originating from the emitting antenna of said sensor, Advantageously, but optionally, the device according to the invention may further comprise one of the following characteristics:

the interrogator comprises an emitting antenna and a receiving antenna, the antennas of the interrogator emit and receive polarized waves, preferably the polarization of which is crossed, the antennas of the sensor emit and receive polarized waves, whose polarizations correspond to the respective polarizations of the antennas of the interrogator, the interrogator further comprises a synthesizer feeding an emitting antenna of the interrogator, and a receiver configured to analyze the received power originating from an emitting antenna of the sensor, the interrogator is powered with electrical energy, the antennas of the sensor are patch antennas, the resonance frequency of the receiving antenna of the sensor, is close to 2.5 GHz, the frequency doubler comprises a non-linear junction acting as a doubler, the non-linear junction being preferably a Schottky type diode, and the sensor is composed of an array of antennas in order to improve the signal-to-noise ratio within the device.

The present invention further relates to a method for implementing the device previously described, comprising the steps of:

illuminating the sensor at a fixed frequency, corresponding to the resonance frequency of the receiving antenna when the sensor is in contact with air, measuring the received power, originating from the emitting antenna of the sensor, at the frequency equal to twice the illumination frequency, and based on a received power threshold, send back alerts to a wind turbine control system Advantageously, but optionally, the method according to the invention may further comprise the following characteristics:

the received power threshold comprises three distinct levels (S0, S1, S2) which depend on the prior parameterization of the device, if:

The received power level is comprised between S1 and S0 (S1<S0), then the blade not being considered as iced, no alert is sent back to the wind turbine control system, The received power level is comprised between S2 and S1 (S2<S1), then the blade being considered as iced, an icing alert is sent back to the wind turbine control system, and The received power level is less than S2, then the blade being considered as covered with water, a de-icing alert is sent back to the wind turbine control system.

several sensors disposed along a blade are simultaneously interrogated.

The proposed solution of icing and de-icing detection device allows improving the signal-to-noise ratio (noise arising from unwanted echoes of the environment) of the interrogation electronic chain by means of a frequency doubling device directly integrated to the sensor.

The use of a device according to the invention also has the advantage of proposing a low-cost detection device.

In addition, the size and thickness of TAG-type elements are reduced, which allows an integration directly on the blade by gluing, without a priori impacting the profile of the blade, in particular its drag.

Moreover, the possibility of operating the interrogator intermittently allows reducing the electromagnetic impact of the device on the environment, while saving energy.

The device according to the invention also has the advantage of not requiring any processing of the exchanged information, since the icing and deicing measurement is based on a power threshold received by the interrogator. In addition, the ice sensor according to the invention operates on the basis of an electrical permittivity measurement. Thus, the received power measurement is not influenced by the ambient temperature.

Another advantage of the invention is to limit the risk of lightning strike on the device, the TAG being passive. In any case, the loss of the TAG (loss of the signal) does not cause a false alarm.

Finally, the possibility of simultaneously interrogating several TAGs disposed along a blade, without complicating the interpretation of the measurement results, makes it possible to minimize the replacement operations.

QUICK DESCRIPTION OF THE FIGURES

Other characteristics, objects and advantages of the present invention will become apparent upon reading the following detailed description and with reference to the appended drawings given by way of non-limiting example and in which.

DETAILED DESCRIPTION OF THE INVENTION

An icing and deicing detection device according to an embodiment of the invention will now be described.

The device comprises two distinct elements configured to interact together by electromagnetic connection:

a passive ice sensor 6 capable of being remotely interrogated, which can be glued on a blade of a wind turbine whose icing and de-icing periods are to be controlled, and an interrogator 8, powered with energy and whose antennas 9, 10 are positioned on the hub of the wind turbine, opposite each instrumented blade.

The various components of the device will be described in more detail.

Ice Sensor

The principle of the ice sensor 6 is based on a TAG or electromagnetic tag, with the particularity of operating at a long distance (50-100 m between the TAG and the interrogator). "RFID" (Radio Frequency Identification)-type TAGs are conventionally used to secure objects, operating at short distance (a few centimeters between the RFID TAG and the interrogator). Such devices emit and receive information at the same frequency, and have an internal processor, self-powered by the received electromagnetic energy, for processing the exchanged information.

Figure 1:
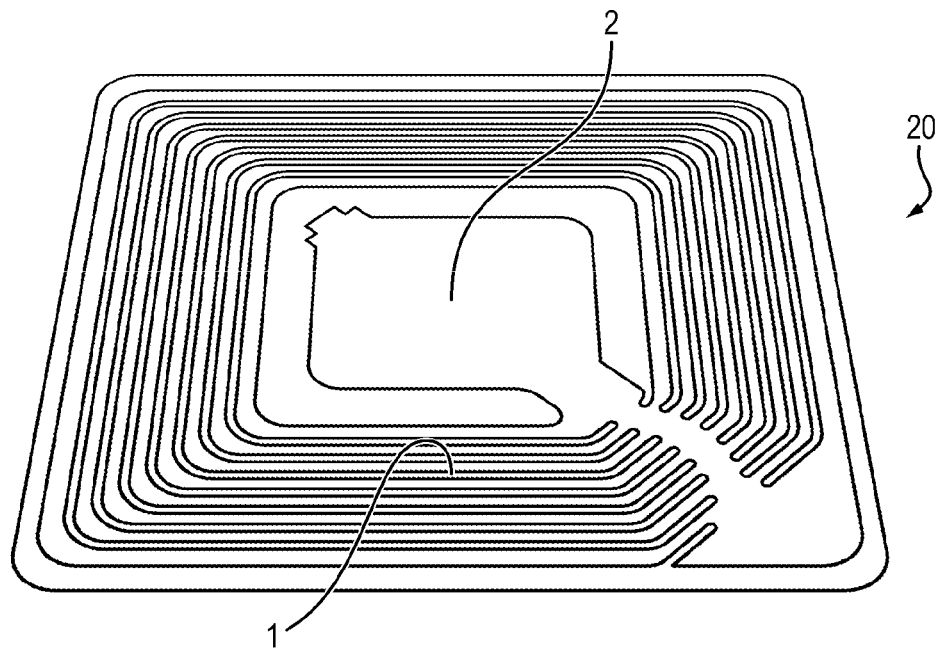
FIG. 1 represents an RFID TAG device known from the prior art.

With reference to FIG. 1, an RFID TAG 20 is usually composed of an antenna 1 acting as antenna for emitting/receiving electromagnetic signals, and of a chip 2 coding the returned information.

The TAG 6 of the icing and deicing detection device 7 according to the invention is based on the use of the emitting/receiving antenna as an ice sensor.

Indeed, each material can be characterized by an electromagnetic quantity, in particular the relative dielectric permittivity which is 1 for air, 80 for pure water and 5 for ice in a frequency range comprised between 100 kHz and 10 GHz. The response of the antenna therefore depends on the material to its contact. According to the interrogation method of the TAG, and on the analysis of the signals made therefrom, the presence of a material on the antenna can be detected by analyzing the modification of the resonance frequency of the antenna, its electrical impedance, etc.

Figure 2:
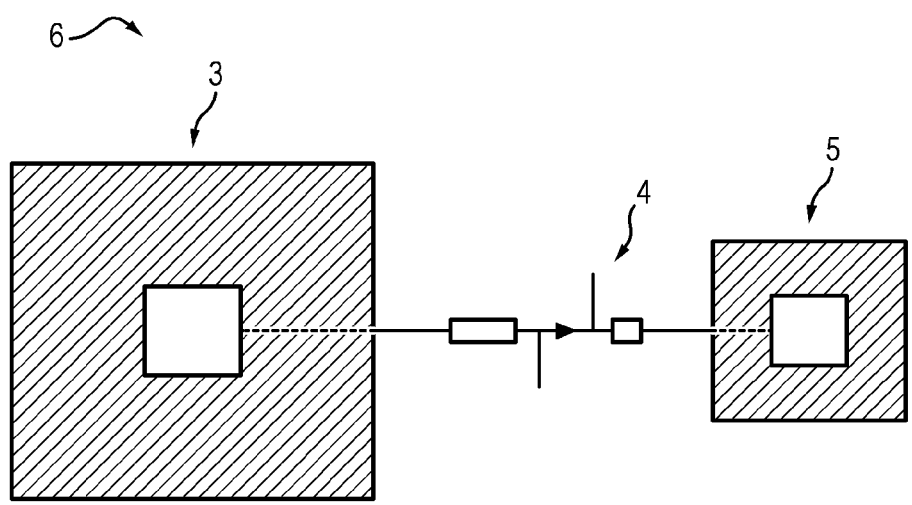
FIG. 2 represents an icing and deicing sensor according to the invention.

With reference to FIG. 2, the TAG 6 according to the invention comprises a receiving antenna 3, of frequency F0, a frequency doubler 4, and an emitting antenna 5 of double frequency, F1. It is also achievable on a single support, typically a printed circuit of thickness 1.6 mm, or typically within a range from 0.8 mm to 3.2 mm.

Each antenna 3, 5 is in the form of a patch. By "patch antenna" is meant a planar antenna whose radiating element is a conductive, advantageously square, surface separated from a conductive reflector plane by a dielectric sheet.

The resonance frequencies and the powers emitted by the antennas 3, 5 depend on the geometry of the structure whose icing and deicing are studied, and on the substrate in which said antennas 3, 5 are formed. Advantageously, but not exclusively, the resonance frequency of the receiving antenna 3 is close to 2.5 GHz, and that of the emitting antenna 5 is close to 5 GHz. By "close" is meant that the actual value of the resonance frequencies of the antennas is within a range of more or less 2%, around the reference values. These frequencies indeed correspond to an ISM band free of copyright and the powers emitted do not exceed that of a "box" (20 dBm). The antennas 3, 5 allow communication with the interrogator 8 and act as an ice sensor on the basis of an electrical permittivity measurement.

The passive TAG 6 uses a frequency doubler 4, interposed between the receiving antenna 3 and the emitting antenna 5, which makes it possible to discriminate the echoes of the environment (blade, mast, etc.), and which makes it possible to minimize the noise arising from unwanted echoes of the environment. Since the frequency doubler 4 is interposed between the receiving antenna 3 and the emitting antenna 5, an electrical signal flowing from the receiving antenna 3 to the emitting antenna 5 therefore systematically passes through the frequency doubler 4. The frequency doubler 4 consists of adaptation modules and a non-linear junction acting as a doubler, according to characteristics known per se. Advantageously but not exclusively, the non-linear junction can be a Schottky type diode (Zero Bias Schottky Detector Diodes—HSMS 2850 Avago). The diode is then adapted in impedance to the antennas by means of electronic tracks of different widths, lengths and nature.

Although the sensor TAG 6 described above consists of two patch antennas 3, 5, it is also possible to use an array of patch antennas in order to adapt the directivity of the antennas and thus improve the signal-to-noise ratio, arising from unwanted echoes of the environment, of the measurement chain. In this case, the sensor 6 comprises a given set of N0 emitting patch antennas 5 and N1 receiving patch antennas 3 (N0 and N1>2), and a frequency doubler interposed between receiving antennas and emitting antennas. The array thus constituted is placed on a wind turbine blade according to variable configurations, according to the constraints specific to the considered installation.

This embodiment allows the integration of the antennas 9, 10 of the interrogator 8 on the hub of the wind turbine. This array of antennas is then configured to adapt the antenna radiation pattern and thus improve the signal-to-noise ratio and therefore the exchange range between the sensor 6 and the interrogator.

Interrogator

The interrogator 8 is based on the principle of harmonic RADAR.

It is composed of a synthesizer 11 feeding an antenna 9 emitting a wave at the resonance frequency F0 of the receiving antenna 3 of the sensor 6, and a receiving antenna 10 connected to a receiver 12 set to analyze the received power Pe" originating from the emitting antenna 5 of the sensor 6, at the frequency F1 of the emitting antenna 5 of the sensor 6. To improve the signal-to-noise ratio, said antennas 9, 10 of the interrogator 8 emit and receive polarized waves. The polarizations of the antennas 9, 10 of the interrogator 8 are crossed in order to minimize the coupling between the emitting antenna 9 and the receiving antenna 10. The polarizations of the antennas 3, 5 of the TAG 6 are also crossed to correspond to the respective polarizations of the antennas 9, 10 of the interrogator.

Figure 3:
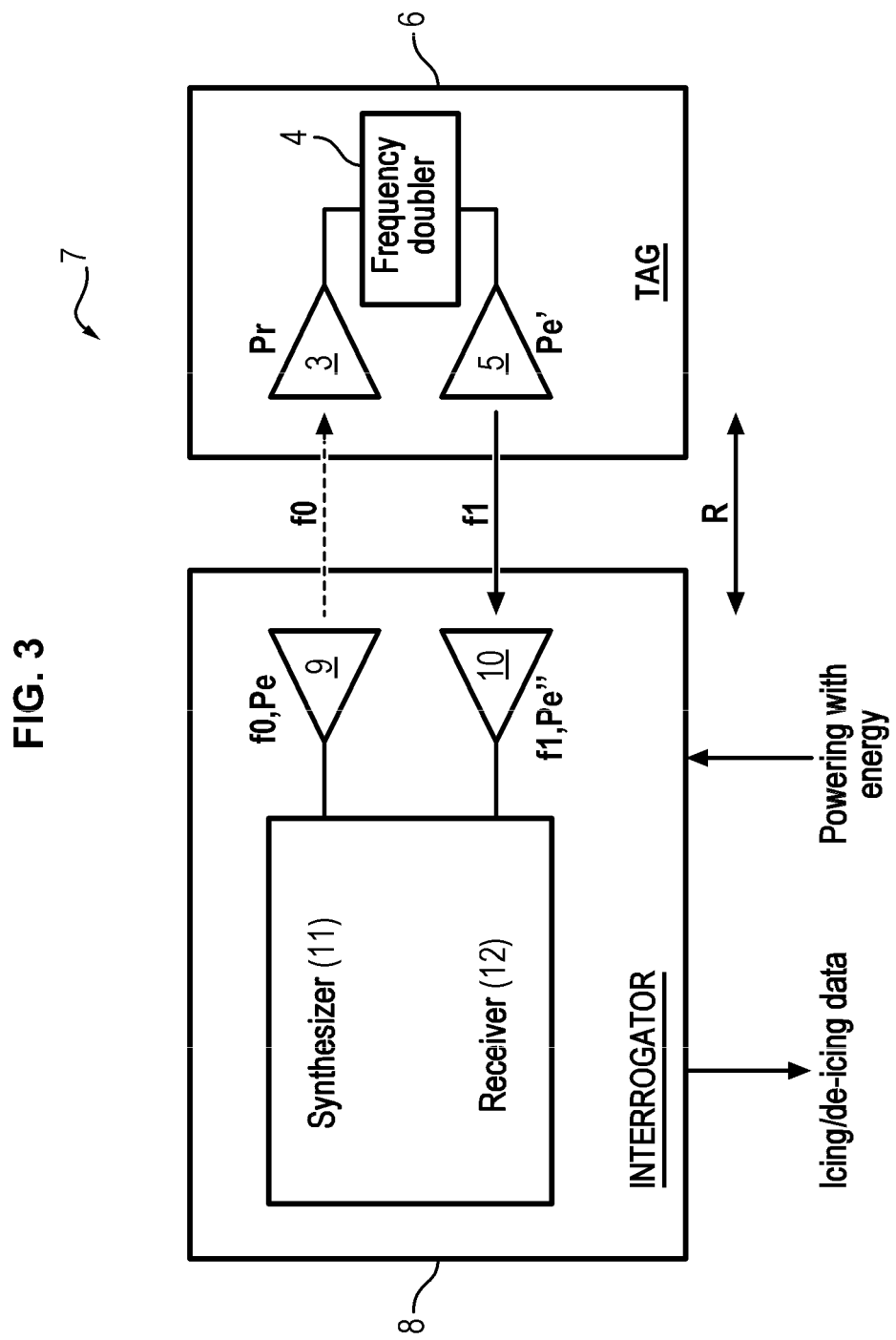
FIG. 3 represents a complete diagram of the icing and deicing detection device according to the invention.

The complete system (interrogator 8 and TAG 6) is schematized in FIG. 3. It shows the interrogator 8, powered with energy, emitting at a frequency F0 for an emitted power Pe towards the TAG 6, located at a distance R. For a given distance, the TAG 6 receives F0 at a received power Pr (Pr≤Pe, depending on the material covering the receiving antenna 3 of the TAG 6), doubles the frequency at F1, and re-emits a signal to the power Pe'(Pe'≤Pr, depending on the material of which the emitting antenna 5 of the TAG 6 is covered). The wave received by the interrogator at F1 and Pe" (Pe"≤Pe' taking into account the attenuation on the return path) is analyzed and data relating to icing and deicing are extracted.

Icing and Deicing Detection Method

The icing and deicing detection method according to the invention will now be described. This method may in particular implement a device 7 according to the invention, such as the one described above.

Firstly, the physical behavior of the ice sensor 6, during icing and de-icing periods, is described.

On contact with air, the response of the receiving antenna 3 has a given resonance F0. When a significant layer of water covers the antenna 3, there is no measurable resonance. When ice is formed to the contact with the antenna 3, the resonance is shifted towards the low frequencies. In addition, the frequency shift depends on the thickness of ice, and it is little dependent on the temperature of the antenna.

The response of the frequency doubler 4 is little impacted by the material to its contact.

To detect the presence of ice on the TAG 6, it is therefore necessary to measure the effect of the shift to the low frequencies described above.

The most natural solution would be to frequency-sweep and then locate the minimum resonance frequency, in order to deduce therefrom the material to the contact with the TAG 6. This solution requires the development of an interrogator having the ability to make a frequency-sweep, which is expensive.

The method according to the invention therefore proposes to illuminate the TAG 6 at a fixed frequency F0, the one of the receiving antenna 3, and to measure the power emitted at the frequency F1 of the emitting antenna 5. The principle of the interrogation step according to the invention then consists in measuring the attenuation of the signal emitted at the frequency F1 of the emitting antenna 5 as a function of the material to the contact with the TAG 6.

This method is based on the principle of harmonic radar. It is simpler to achieve in terms of technology and has the advantage of having a great dynamics of detection because it focuses on specific frequencies.

The operation of the device according to the invention is as follows:

In the presence of air on the sensor 6, the measured power Pe" by the interrogator 8 is maximum S0 (S0 slightly lower than the emitted power Pe, due to the propagation of the electromagnetic signal).

In the presence of ice on the sensor 6, the measured power Pe" by the interrogator 8 is decreased since the resonance frequency of the receiving 3 and emitting 5 antennas of the TAG 6 is mismatched with respect to the emission frequency F0 of the interrogator 8 and the emission frequency F1 of the emitting antenna 5 of the TAG 6 (typically, the measured power decrease is of about 10 to 20 dB for the wave received by the receiving antenna 3). According to the prior parameterization of the device 7, a threshold S1 of measured power Pe" (S1<S0) is then established, below which the analyzer returns an icing signal.

In the presence of water on the sensor 6, the measured power Pe" by the interrogator 8 is minimum, corresponding to the noise since, on the one hand, the mismatch of the receiving antenna 3 of the TAG 6 is such that it no longer receives the frequency F0 of the interrogator 8 and, on the one hand, the emitting antenna 5 of the TAG 6 is no longer adapted to emit a frequency at F1. According to the prior parameterization of the device 7, a threshold S2 of measured power Pe" (S2<S1<S0) is then established, below which the analyzer returns a de-ice signal.

By tracking the received power Pe" by the interrogator 8, it is therefore possible to know in which situation the TAG 6 is located. A threshold of the received power Pe" is then defined to allow sending back alerts to a wind turbine control system.

In addition, the sensor being passive, the risk of lightning strike on the device is limited. In any case, the loss of the TAG (loss of the signal) does not cause a false alarm. The loss of the signal then corresponds to the mere reception of the noise of the environment, which is equivalent to the detection of the sensor covered with water. The method according to the invention thus also provides the possibility of simultaneously interrogating several TAGs, disposed along a blade, without complicating the interpretation of the measurement results. This makes it possible to secure the measurement chain in the event of loss of a TAG, but also to minimize the replacement operations.

Advantageously, in the frequency band of the TAG 6, in the order of 20 MHz, a frequency-drift of the interrogator 8 is allowed, without penalizing the detection. The device thus gains in robustness.

In addition, it is possible to operate the interrogator intermittently, in order to reduce the electromagnetic impact of the device on the environment, while saving energy.

CITED REFERENCES

[1] M. Hirsch & al., Recent developments in miniaturized planar harmonic radar antennas, 30th AMTA Symposium, november, 2008

[2] Jordi Romeu Gomez, Design of a Chipless Harmonic Radar-Temperature Sensor, thesis of Institute for Microwave Engineering and Photonics, 2013

The invention claimed is:

1. A device for detecting icing and deicing of a wind turbine blade, the device comprising:
    on the one hand, a sensor placed on a surface of a blade, and comprising:
        O-a first antenna, called "receiving antenna",
        O-a second antenna, called "emitting antenna",
        O-a frequency doubling device interposed between said first and second antennas, and
    on the other hand, an interrogator configured to emit an electromagnetic wave towards the receiving antenna of said sensor, and to receive an electromagnetic wave originating from the emitting antenna of said sensor.

2. The device according to claim 1, wherein the interrogator comprises an emitting antenna and a receiving antenna.

3. The device according to claim 2, wherein the antennas of the interrogator emit and receive polarized waves.

4. The device according to claim 3, wherein the antennas of the sensor emit and receive polarized waves, whose polarizations correspond to the respective polarizations of the antennas of the interrogator.

5. The device according to claim 1, wherein the interrogator further comprises a synthesizer feeding an emitting antenna of the interrogator, and a receiver configured to analyze the received power originating from the emitting antenna of the sensor.

6. The device according to claim 1, wherein the interrogator is powered with electrical energy.

7. The device according to claim 1, wherein the antennas of the sensor are patch antennas.

8. The device according to claim 1, wherein a resonance frequency of the receiving antenna of the sensor is close to 2.5 GHz.

9. The device according to claim 1, wherein the frequency doubler comprises a non-linear junction acting as a doubler.

10. The device according to claim 1, wherein the sensor is composed of an array of antennas in order to improve a signal-to-noise ratio within the device.

11. A method implementing a device for detecting the icing and deicing of a wind turbine blade according to claim 1, the method comprising the steps of:
    illuminating the sensor at a fixed frequency, corresponding to a resonance frequency of the receiving antenna when the sensor is in contact with air,
    measuring a received power, originating from the emitting antenna of the sensor, at a frequency equal to twice the fixed illumination frequency, and
    based on a received power threshold, sending back alerts to a wind turbine control system.

12. The method according to claim 11, wherein the received power threshold comprises three distinct levels which depend on a prior parameterization of the device.

13. The method of claim 12, wherein if:
    the received power level is comprised between S1 and S0, then the blade not being considered as iced, no alert is sent back to the wind turbine control system,
    the received power level is comprised between S2 and S1, then the blade being considered as iced, an icing alert is sent back to the wind turbine control system, and
    the received power level is lower than S2, then the blade being considered as covered with water, a de-icing alert is sent back to the wind turbine control system.

14. The method according to claim 11 wherein several sensors disposed along a blade are simultaneously interrogated.

\* \* \* \* \*